United States Patent
Kim et al.

(10) Patent No.: US 12,206,663 B2
(45) Date of Patent: Jan. 21, 2025

(54) AUTHENTICATION INFORMATION PROCESSING METHOD AND APPARATUS AND USER TERMINAL INCLUDING AUTHENTICATION INFORMATION PROCESSING METHOD AND APPARATUS

(71) Applicant: ICTK HOLDINGS CO., LTD., Seongnam-si (KR)

(72) Inventors: Dong Hyun Kim, Yongin-si (KR); Jae Seong Lee, Seoul (KR)

(73) Assignee: ICTK Holdings Co., Ltd., Seongnam-si (KR)

( * ) Notice: Subject to any disclaimer, the term of this patent is extended or adjusted under 35 U.S.C. 154(b) by 356 days.

(21) Appl. No.: 17/420,113

(22) PCT Filed: Feb. 3, 2020

(86) PCT No.: PCT/KR2020/001569
§ 371 (c)(1),
(2) Date: Jun. 30, 2021

(87) PCT Pub. No.: WO2020/159328
PCT Pub. Date: Aug. 6, 2020

(65) Prior Publication Data
US 2022/0052997 A1   Feb. 17, 2022

(30) Foreign Application Priority Data

Feb. 1, 2019   (KR) .................. 10-2019-0013990
Feb. 3, 2020   (KR) .................. 10-2020-0012389

(51) Int. Cl.
*G06F 21/00*   (2013.01)
*H04L 9/32*   (2006.01)
*H04L 9/40*   (2022.01)

(52) U.S. Cl.
CPC ........ *H04L 63/0861* (2013.01); *H04L 9/3278* (2013.01); *H04L 2463/081* (2013.01)

(58) Field of Classification Search
CPC ............... H04L 63/0861; H04L 9/3278; H04L 2463/081; H04L 9/0866; H04L 9/3228;
(Continued)

(56) References Cited

U.S. PATENT DOCUMENTS

| 10,341,112 B2 | 7/2019 | Linnartz |
| 2011/0002461 A1 | 1/2011 | Erhart et al. |

(Continued)

FOREIGN PATENT DOCUMENTS

| CN | 104620534 | 5/2015 |
| JP | 2017511536 A | 4/2017 |

(Continued)

OTHER PUBLICATIONS

ISA Korean Intellectual Property Office, International Search Report Issued in Application No. PCT/KR2020/001569, May 13, 2020, WIPO, 2 pages.
(Continued)

*Primary Examiner* — Shin-Hon (Eric) Chen
*Assistant Examiner* — Vladimir I Gavrilenko (57) ABSTRACT

Disclosed are an authentication information processing method and apparatus and a user terminal including an authentication information processing method and apparatus. The authentication information processing method performed by the disclosed authentication information processing apparatus comprises the steps of: obtaining biometric information of a user; obtaining a unique key corresponding to the authentication information processing apparatus; and generating an authentication key by using at least a part of the biometric information and at least a part of the unique key.

9 Claims, 8 Drawing Sheets

(58) Field of Classification Search
CPC ............ H04L 9/3231; H04L 2463/082; H04L 2463/102; G06F 21/32; G06F 21/45; G06F 21/73
See application file for complete search history.

(56) References Cited

U.S. PATENT DOCUMENTS

| | | | |
|---|---|---|---|
| 2015/0222430 A1 | 8/2015 | Kim et al. | |
| 2017/0279606 A1 | 9/2017 | Kara-Ivanov et al. | |
| 2017/0295027 A1 | 10/2017 | Kim et al. | |
| 2018/0137492 A1* | 5/2018 | Abu Hamam | G07F 9/026 |
| 2018/0198609 A1* | 7/2018 | Khan | H04L 9/3066 |
| 2018/0252806 A1* | 9/2018 | Miranda | G01S 7/2813 |
| 2020/0106600 A1* | 4/2020 | Dreifus | H04L 9/3066 |
| 2020/0366496 A1* | 11/2020 | Mallon | H04L 9/0643 |

FOREIGN PATENT DOCUMENTS

| | | |
|---|---|---|
| KR | 10-2016-0006836 | 1/2016 |
| KR | 101622253 B1 | 5/2016 |
| KR | 101882289 B1 | 7/2018 |
| KR | 20180128615 A | 12/2018 |

OTHER PUBLICATIONS

European Patent Office, Extended European Search Report Issued in Application No. 20749323.0, Jul. 13, 2022, Germany, 8 pages.

Decision of Examination and Search Report Dated Feb. 24, 2023 From the Intellectual Property Office, Ministry of Economic Affairs of the Republic of Taiwan, R.O.C. Re. Application No. TW109103264 and Its Translation Into English. (25 Pages).

Communication Pursuant to Article 94(3) EPC Dated Dec. 1, 2023 From the European Patent Office Re. Application No. 20749323.0. (5 Pages).

International Search Report and the Written Opinion Dated May 13, 2020 From the International Searching Authority Re. Application No. PCT/KR2020/001569 and Its Translation Into English. (13 Pages).

* cited by examiner

AUTHENTICATION INFORMATION PROCESSING METHOD AND APPARATUS AND USER TERMINAL INCLUDING AUTHENTICATION INFORMATION PROCESSING METHOD AND APPARATUS

CROSS REFERENCE TO RELATED APPLICATIONS

The present application is a U.S. National Phase of International Application No. PCT/KR2020/001569 entitled "AUTHENTICATION INFORMATION PROCESSING METHOD AND APPARATUS AND USER TERMINAL INCLUDING AUTHENTICATION INFORMATION PROCESSING METHOD APPARATUS," and filed on Feb. 3, 2020. International Application No. PCT/KR2020/001569 claims priority to Korean Patent Application No. 10-2019-0013990 filed on Feb. 1, 2019 and Korean Patent Application No. 10-2020-0012389 filed on Feb. 3, 2020. The entire contents of each of the above-listed applications are hereby incorporated by reference for all purposes.

TECHNICAL FIELD

Example embodiments relate to an authentication information processing method and apparatus and a user terminal including the authentication information processing method and apparatus and, more particularly, to a method and apparatus for generating an authentication key using at least a portion of bio-information of a user and at least a portion of a unique key corresponding to a device.

BACKGROUND AND SUMMARY

The advancement of information society has increased the necessity of the protection of personal privacy and raised the safety of a means of authentication as an important technical issue. Particularly, for access to a device or system for electronic finance, a high level of confidence in a means of authentication is required for the internet of things (IoT) or machine-to-machine (M2M) authentication. Authentication may be classified into knowledge-based authentication, possession-based authentication, authentication using bio-information of a user, and the like. Authentication may also be classified into single-factor authentication, two-factor authentication, multi-factor authentication, and the like based on whether authentication is performed with a single means or multiple means.

Knowledge-based authentication may refer to authentication that is performed by verifying whether the information used as a means of authentication, such as, for example, a personal identification number (PIN), an identification (ID), and a password or passcode, is known.

Possession-based authentication may refer to authentication that is performed by verifying whether a tangible or intangible object to be used for authentication, for example, a one-time password (OTP) token, a security card, an ID card, an accredited certificate file, and the like is possessed or not. The safety of the former may be compromised when others gain authentication information, and the safety of the latter may be compromised when others take an object to be used for authentication. Thus, authentication for a financial transaction may not depend on only one of both, but use both in more cases to increase safety or security. For example, in the case of a remittance using an internet banking service, a value read from an OTP token may also be required even when an ID and a password are already used for login, or a password of an accredited certificate may also be required even when the accredited certificate is used. This is an example of two-factor or multi-factor authentication.

Recently, recognizing and verifying bio-information of a user that includes, for example, a fingerprint, an iris, a voice, and a face of the user has become a major means of authentication. Depending on understandings, such biometric authentication using bio-information may be construed as another example of possession-based authentication. However, the bio-information may not be separable from the user himself/herself and not be exchangeable, but be used itself to verify the user. Thus, biometric authentication may be construed as being distinguished from possession-based authentication which is traditional. In addition, the bio-information may not be lost, or not be given to others to be shared with them. Thus, biometric authentication may be distinguished from knowledge-based authentication. Hereinafter, the following description will be provided on the premise that authentication using bio-information is separate authentication distinguished from a traditional type of authentication which is possession-based authentication or knowledge-based authentication. This authentication using bio-information will be referred to herein as biometric authentication or bio-authentication.

As an authentication method using user authentication and possession-based authentication has changed from single-factor authentication to two-factor or multi-factor authentication, the number of authentication steps has increased for security, causing inconvenience to users. In addition, stepwise authentication may increase data processing time and necessary costs for the use of services.

DISCLOSURE OF INVENTION

Technical Solutions

According to an example embodiment, there is provided an authentication information processing method performed by an authentication information processing apparatus, the authentication information processing method including obtaining bio-information of a user, obtaining a unique key corresponding to the authentication information processing apparatus, and generating an authentication key using at least a portion of the bio-information and at least a portion of the unique key.

The portion of the bio-information may be at least a portion extracted from the bio-information of the user that ensures preset standard-based time-invariance.

A degree of time-invariance ensured in the bio-information may be determined based on at least one of a type of the bio-information, a characteristic of the user, an environment in which the bio-information is sensed, or a characteristic of a sensor that senses the bio-information.

The portion of the unique key may be at least a portion extracted from the unique key by the number of bits that is determined based on the number of bits of the portion extracted from the bio-information and the number of bits of the authentication key to be generated.

The portion of the unique key may be extracted from the unique key by the number of bits that is insufficient with the number of bits of the portion extracted from the bio-information for the number of bits to be generated by the authentication key.

The generating of the authentication key may include generating the authentication key including the portion of the bio-information and the portion of the unique key, or generating the authentication key by applying an encryption algorithm to the portion of the bio-information and the portion of the unique key.

The authentication information processing method may further include performing an authentication operation based on whether the authentication key corresponds to an authentication key preregistered in the authentication information processing apparatus.

The authentication information processing method may further include determining whether the user is a valid user based on the bio-information of the user. In response to the user being determined to be the valid user, the obtaining of the unique key may include obtaining the unique key corresponding to the authentication information processing apparatus.

The generating of the authentication key may include generating the authentication key further using at least a portion of information input from the user and/or at least a portion of authentication information received from a counterpart terminal of the authentication information processing apparatus.

The bio-information may include information associated with at least one of a fingerprint, an iris, a voice, a face, a vein distribution, or a retina of the user.

The unique key may be determined based on a physically unclonable function (PUF) connected to at least a portion of the authentication information processing apparatus.

According to another example embodiment, there is provided an authentication information processing apparatus including a processor, and a memory including therein at least one instruction that is executable by the processor. When the instruction is executed in the processor, the processor may obtain bio-information of a user, obtain a unique key corresponding to the authentication information processing apparatus, and generate an authentication key using at least a portion of the bio-information and at least a portion of the unique key.

The portion of the bio-information may be at least a portion extracted from the bio-information of the user that ensures preset standard-based time-invariance.

The portion of the unique key may be at least a portion extracted from the unique key by the number of bits that is determined based on the number of bits of the portion extracted from the bio-information and the number of bits of the authentication key to be generated.

The number of bits of the portion extracted from the bio-information may be determined based on at least one of a type of the bio-information, a characteristic of the user, an environment in which the bio-information is sensed, or a characteristic of a sensor that senses the bio-information.

According to still another example embodiment, there is provided a user terminal including a biosensor configured to sense bio-information of a user who uses the user terminal, a processor configured to process one or more operations to be performed in the user terminal, and an authentication information processing apparatus configured to generate an authentication key using at least a portion of the bio-information and at least a portion of a unique key corresponding to the user terminal.

The user terminal may include a smartphone, a data storage device, an identification (ID) card, and a credit card that are to be controlled by the user.

Advantageous Effects

According to an example embodiment, it is possible to improve convenience and security and improve an issue associated with time-invariance of bio-information itself, through single processing of user authentication and device authentication (that is, possession-based authentication) by performing an authentication process using an authentication key that is generated based on bio-information of a user and a unique key corresponding to a device.

According to an example embodiment, it is possible to generate an authentication key that is robust against the risk of being hacked in a processor 120 by bypassing the processor 120 even when bio-information of a user is sensed by a biosensor 110 and by transmitting the bio-information to an authentication information processing apparatus 130.

According to an example embodiment, it is possible to enable a highly convenient application service even when two-factor authentication of bio-information-based user authentication and device information-based device authentication is performed. As to be described hereinafter, it is possible to enable secure and convenient authentication that ensures time-invariance in various fields that requires authentication, for example, a payment based on voice recognition in a vehicle, an electronic payment using an internet of things (IoT) device, a financial transaction performed using a smartphone, and the like.

DETAILED DESCRIPTION

Best Mode for Carrying Out the Invention

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1:
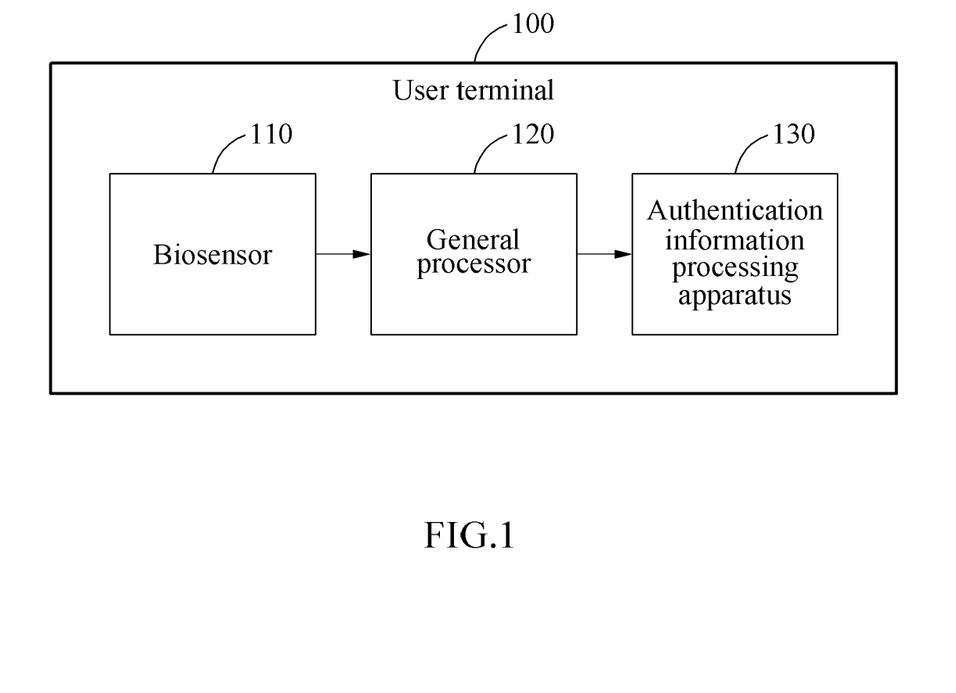
FIG. 1 is a diagram illustrating an example of a configuration of a user terminal according to an example embodiment.

FIG. 1 is a diagram illustrating an example of a configuration of a user terminal according to an example embodiment.

Referring to FIG. 1, a user terminal 100 may include a biosensor 110, a processor 120, and an authentication information processing apparatus 130. The user terminal 100 may be a device for which an authentication process is required to perform an operation requested by a user and may include, for example, a computing device (e.g., a smartphone, a tablet, a laptop, a personal computer (PC), etc.), a wearable device (e.g., a smartwatch, smart eyeglasses, etc.), a home appliance (e.g., a smart speaker, a smart television (TV), a smart refrigerator, etc.), and others (e.g., a smart identification (ID) card, a smart credit card, a data storage device, a smart vehicle, an internet of things (IoT) device, etc.).

The biosensor 110 may be a device configured to sense bio-information of the user and may be provided in the user terminal 100 as one or more biosensors such that the user terminal 100 uses the bio-information as a means of authentication. The bio-information may include, for example, information associated with at least one of a fingerprint, an iris, a voice, a face, a vein distribution, or a retina of the user.

The processor 120 may be a device or an operational unit configured to process a general operation that is performed in the user terminal 100 and may include, for example, a central processing unit (CPU) and a microcontroller unit (MCU). The bio-information output from the biosensor 110 may be transmitted to the authentication information processing apparatus 130 through the processor 120.

The authentication information processing apparatus 130 may be a device configured to process authentication information for performing authentication and may generate an authentication key using at least a portion of the bio-information and at least a portion of a unique key corresponding to the authentication information processing apparatus 130. The unique key may be determined based on a physically unclonable function (PUF) connected to at least a portion of the authentication information processing apparatus 130. The PUF may provide an unpredictable digital value that is determined based on a process variation in a manufacturing process. The PUF will be described in detail with reference to FIG. 4.

In addition, the authentication information processing apparatus 130 may perform the authentication process based on the generated authentication key. For example, but not limited thereto, the generated authentication key may be a key (e.g., a private key) that is based on a symmetric or asymmetric key encryption method, for example. The authentication process may be performed based on whether the generated authentication key corresponds to a previously registered authentication key.

As described above, the authentication information processing apparatus 130 may perform the authentication process through the authentication key that is generated based on the bio-information of the user and the unique key corresponding to the authentication information processing apparatus 130, thereby effectively performing both user authentication and device authentication (that is, possession-based authentication) all at once. That is, it is possible to prevent an unauthorized person who temporarily possesses the user terminal 100 or takes the bio-information of the user from performing a self-authentication process without permission.

In addition, as the bio-information of the user may be transmitted to the authentication information processing apparatus 130 while bypassing the processor 120 even though it is output from the biosensor 110, it is possible to generate the authentication key that is robust against a risk of the processor 120 being hacked.

According to an example embodiment, the authentication information processing apparatus 130 may encrypt bio-information based on a unique key and store the encrypted bio-information in an internal memory, and thus maintain a high level of security for the bio-information. In addition, an authentication key-based authentication process may be performed without a separate instruction for start, when the biosensor 110 senses bio-information of a user and then an authentication key is generated according to a preset process.

For the convenience of description, an authentication key may also be referred to herein as an identification key or simply as a key.

Figure 2:
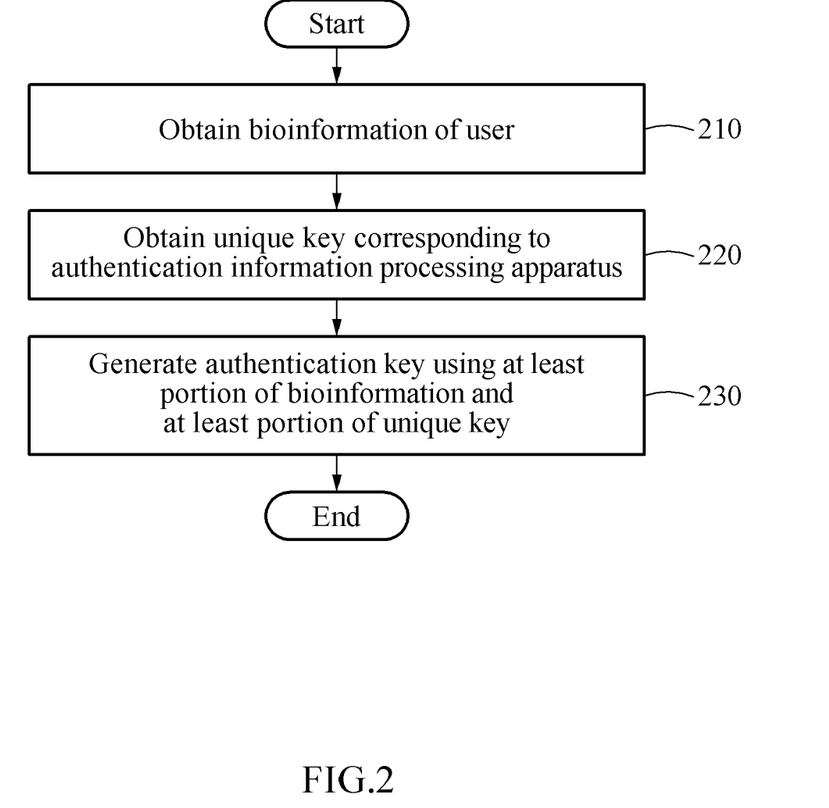
FIG. 2 is a flowchart illustrating an example of an authentication information processing method according to an example embodiment.

FIG. 2 is a flowchart illustrating an example of an authentication information processing method according to an example embodiment.

Referring to FIG. 2, illustrated is an authentication information processing method to be performed by a processor included in an authentication information processing apparatus according to an example embodiment.

In operation 210, the authentication information processing apparatus obtains bio-information of a user. For example, the authentication information processing apparatus may receive the bio-information of the user that is sensed by a biosensor.

In operation 220, the authentication information processing apparatus obtains a unique key corresponding to the authentication information processing apparatus. For example, the unique key may include a PUF value that is determined based on an electrical property (e.g., a resistance value, a capacitor value, a presence or absence of a short circuit, etc.) that is randomly determined based on a process variation in a manufacturing process.

In operation 230, the authentication information processing apparatus generates an authentication key using at least a portion of the bio-information and at least a portion of the unique key. The portion of the bio-information may be at least a portion extracted from the bio-information of the user that ensures preset standard-based time-invariance. The portion of the unique key may be at least a portion extracted from the unique key by the number of bits that is determined based on the number of bits of the portion extracted from the bio-information and the number of bits of the authentication key to be generated. A further description of which will follow with reference to FIG. 3.

According to an example embodiment, the authentication information processing apparatus may generate the authentication key further using at least a portion of information input from the user and/or at least a portion of identification information received from a counterpart terminal of the authentication information processing apparatus. The information input from the user may include various sets of input information including, for example, an ID, a password, and the like. The counterpart terminal may include, for example, a service business entity, a service provider, and a device of another user (e.g., a server, a personal device, etc.) that provide a certain service to a user terminal including the authentication information processing apparatus or use the service together with the user terminal including the authentication information processing apparatus.

Figure 3:
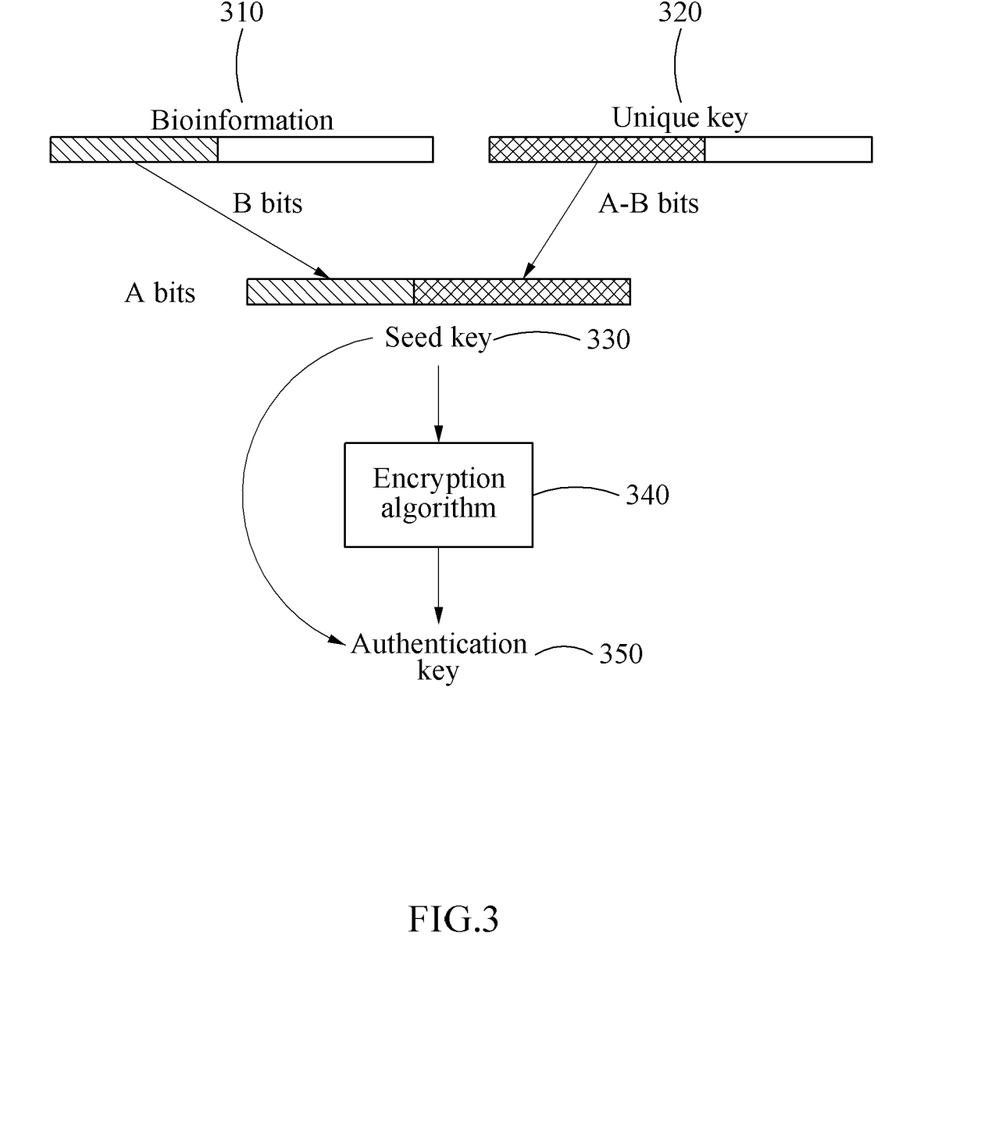
FIG. 3 is a diagram illustrating an example of generating an authentication key according to an example embodiment.

FIG. 3 is a diagram illustrating an example of generating an authentication key according to an example embodiment.

Referring to FIG. 3, an authentication key 350 may be generated from a seed key 330 including at least a portion of bio-information 310 and at least a portion of a unique key 320.

The seed key 330 may be a key that is a basis for generating the authentication key 350 for performing authentication and have a preset number of bits which is assumed herein as A bits for the convenience of description. The seed key 330 may be generated to include therein the portion of the bio-information 310 and the portion of the unique key 320.

The bio-information 310 may not be originally a digital value, but be output as a digital value from a biosensor that senses a biological characteristic of a user in an analog domain. Thus, it is considered that the bio-information 310 may be ineffective in terms of time-invariance. For example, in a case of a voice-based bio-authentication, even the same portion of the bio-information 310 may be determined differently each time recognition is performed due to various factors including, for example, a voice condition of the user and ambient noise. In addition, in a case of a fingerprint, a portion of the bio-information 310 may be determined differently each time due to various factors including, for example, a position/direction at/in which a finger comes into contact with the sensor, a degree of the contact, a state of a surface of the sensor, a degree of wetness of a finger, a temperature, a humidity, and the like. Further, in a case of a face or iris, a portion of the bio-information 310 may be output differently each time due to illumination intensity or other distortion factors. Thus, the bio-information 310 may be misrecognized in some cases. To overcome this issue, the following method is proposed herein.

According to an example embodiment, at least a portion of the bio-information 310 that ensures a certain level of time-invariance may be selected from the bio-information 310 and then be used. Such a selecting operation may be construed as being based on a difference in a level of sampling the biological characteristic of the user by the sensor, or be construed as being post-processing performed after the bio-information 310 of the user is sensed.

A degree of time-invariance ensured in the bio-information 310, or at least a portion of the bio-information 310 that ensures time-invariance, may be determined based on at least one of a type of the bio-information 310, a characteristic of the user, an environment in which the bio-information 310 is sensed, or a characteristic of the sensor that senses the bio-information 310.

The type of the bio-information 310 may include a fingerprint, an iris, a voice, a face, a vein distribution, a retina, and the like. The degree of time-invariance ensured (e.g., bit number, bit length, etc.) may vary depending on a characteristic of a corresponding type. For example, the degree of time-invariance ensured may correspond to approximately 20 to 30 bits in a case of a fingerprint, approximately 40 to 50 bits in a case of an iris, and approximately 20 to 30 bits in a case of a voice. Although the iris may have a greater degree of time-invariance ensured than that of the fingerprint, it may require a relatively heavy process of processing iris information. In addition, for the voice, using a dedicated voice processing server, 4 kbits by which time-invariance is ensured may be extracted from a voice signal of approximately 40 seconds. However, requesting a user for a 40 seconds-long voice utterance may be significantly inefficient. Thus, only approximately 20 to 30 bits that ensure time-invariance may be extracted from a short voice signal, and for an insufficient portion for generating an authentication key, at least a portion of the unique key 320 may be used as described above. Such detailed examples may be changed based on a hardware specification of the biosensor and the like.

The characteristic of the user may include, for example, race, age, physical characteristics, and the like. For example, a fingerprint of a user who experiences excessive sweating or hyperhidrosis may have a relatively smaller degree of time-invariance ensured than a fingerprint of a user who has a dry hand. The environment in which the bio-information 310 is sensed may include various environmental parameters, such as, for example, illumination intensity, temperature, humidity, ambient noise, and the like. In addition, the characteristic of the sensor that senses the bio-information 310 may include, for example, a sensing resolution, a sensing sensitivity, a sensing method, and the like. For example, in a case of an optical fingerprint sensor and an ultrasonic fingerprint sensor, the degree of time-invariance ensured may differ from each other.

In the example of FIG. 3, at least a portion of the bio-information 310 that ensures time-invariance may have B bits. In this example, B may be a natural number that is less than A. In other words, it may not be easy to generate the seed key 330 of A bits only using the portion of the bio-information 310 that ensures time-invariance, and thus an insufficient number of bits which is A-B may be extracted from the unique key 320. Although the unique key 320 will be described in detail with reference to FIG. 4, the unique key 320 may be a PUF value based on an electrical characteristic that is randomly determined based on a process variation in a manufacturing process, which is time-invariant.

That is, the seed key 330 may be formed first with at least a portion of the bio-information 310 that ensures time-invariance, and then a remaining portion thereof may be formed with at least a portion of the unique key 320. As described above, as the seed key 330 is generated based on both the bio-information 310 and the unique key 320, user authentication that is based on the bio-information 310 and device authentication that is based on the unique key 320 may be processed at once through single processing, and thus security and convenience may be improved and a time-invariance related issue of the bio-information 310 itself may be improved. Desirably, half the seed key 330 may be formed with at least a portion of the bio-information 310, and the remaining half the seed key 330 may be formed with at least a portion of the unique key 320. Thus, both user authentication and device authentication may be equally performed without any one of the two being inattentively processed.

The authentication key 350 may be determined based on the seed key 330. According to examples, the seed key 330 may be used as the authentication key 350 without a change, or the authentication key 350 may be generated from the seed key 330 through an encryption algorithm 340.

According to examples, the degree of time-invariance ensured in the bio-information 310 may not be uniformly set based on a uniform standard such as a type of the bio-information 310, but be adaptively determined by verifying or analyzing the bio-information 310 in a process of generating the seed key 330. Thus, in the process of generating the seed key 330, the seed key 330 may be generated by including the bio-information 310 by a length (or the number of bits or a bit number) by which time-invariant information is included while the biosensor is identifying the bio-information 310 (repeatedly identifying with different time and method, as needed) in a registration process, and the rest of the seed key 330 may be formed with the unique key 320.

For example, when the registration process is performed reliably, to generate a seed key S1 using fingerprint information of a user U1 and a unique key of a device M1 of the user U1, N1 bits (N1 is a natural number) of bio-information may be used to generate the seed key S1 and a remaining portion may be extracted from the unique key of the device M1. In contrast, to generate a seed key S2 using fingerprint information of another user U2 and a unique key of a device M2 of the other user U2, N2 bits (N2 is a natural number) of bio-information may be used to generate the seed key S2 and a remaining portion may be extracted from the unique key of the device M2. That is, although the seed keys S1 and S2 to be generated may have the same total length, a proportion between the bio-information and the unique key to be included in each of the seed keys S1 and S2 may differ. This may make a situation more unpredictable for a security attacker, and thus may contribute to the improvement of security.

Figure 4:
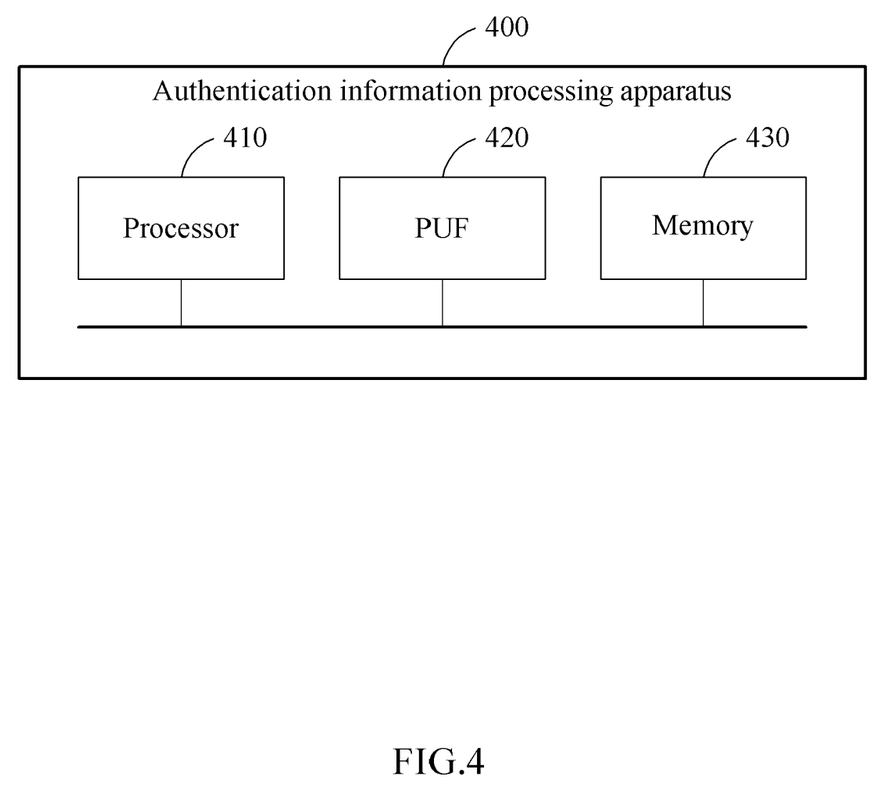
FIG. 4 is a diagram illustrating an example of an authentication information processing apparatus according to an example embodiment.

FIG. 4 is a diagram illustrating an example of an authentication information processing apparatus according to an example embodiment.

Referring to FIG. 4, an authentication information processing apparatus 400 may include a processor 410, a PUF 420, and a memory 430.

The processor 410 may be a device configured to control operations to be performed in the authentication information processing apparatus 400 and include, for example, a CPU, an MCU, and the like. The processor 410 may generate an authentication key by extracting a portion that ensures time-invariance from bio-information, and extracting a portion of a unique key by the number of bits that is insufficient for a seed key. The processor 410 may also perform other operations described above.

The PUF 420 may provide an unpredictable digital value. Although individual PUFs are manufactured in an accurate and same manufacturing process, digital values provided by the individual PUFs may differ from each other due to a process variation. Thus, the PUF 420 may also be referred to as a physical one-way function (POWF) that is practically impossible to be duplicated. The PUF 420 may be used to generate the authentication key for security and/or device authentication. For example, the PUF 420 may be used to provide a unique key to distinguish devices from one another. Such a PUF and a method of implementing it are disclosed in Korean Patent Registration No. 10-1139630, and the entire disclosure of which is incorporated herein by reference.

The memory 430 may store therein sets of data needed for an authentication operation. For example, the memory 430 may store the authentication key generated as described above and bio-information sensed by a biosensor.

Figure 5:
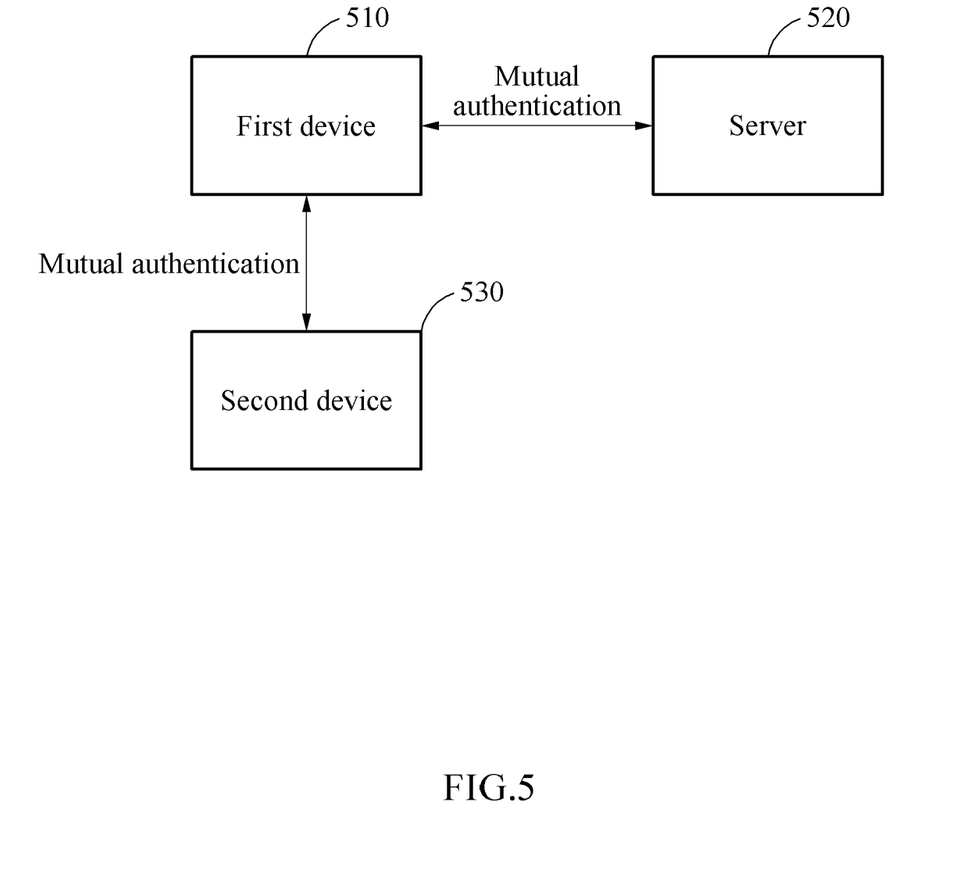
FIG. 5 is a diagram illustrating an example of an authentication scenario according to an example embodiment.

FIG. 5 is a diagram illustrating an example of an authentication scenario according to an example embodiment.

According to example embodiments, how bio-information of a user and a unique value of a device are used for convenient and safe authentication is described above, the example embodiments may be further expanded.

According to another example embodiment, bidirectional authentication through which a device authenticates its counterpart, for example, a service business entity (e.g., a bank, an electronic commerce entity, a public organization, a payment service entity, a content providing entity, etc.) may also be applicable. In such a case, business authentication information that is issued from a reliable service business entity may be used together when initially generating and/or registering an authentication key described above.

For example, an illegitimate part in voice phishing and smishing, for example, may be one part of mutual authentication for payments or financial transactions. For a device, mutual authentication may be needed to verify whether a currently connected counterpart with which the device is to conduct a transaction is a genuine bank or a fake entity. There may be many concerning cases between a user device and a service server (or other user devices in a peer-to-peer service), for example, a case where a fake bank site is an entity for mutual authentication and causes a financial accident, a case where a hacker who pretends to be a legitimate firmware provider makes a user download firmware including a malicious code into a smartphone in a process of updating smartphone firmware or distributes an application including a malicious code to be installed in a device, a case where an illegitimate entity who pretends to be a communications provider or a content provider conducts some illegitimate acts while performing mutual authentication along with a device, and the like. Such cases in a connection between a vehicle and another entity, for example, vehicle-to-vehicle (V2V) and vehicle-to-infrastructure (V2I), or in military equipment and facilities may be a cause of a financial accident and even a threat to life.

According to example embodiments, a genuine entity may provide authentication information (e.g., an identification key) of the genuine entity to a device, and the authentication information may be used for identifying a counterpart entity in the user device. Thus, during mutual authentication between the device and a service provider, user authentication that is based on bio-information, device authentication that is based on a unique key, and counterpart authentication that is based on the authentication information may all be performed bidirectionally. Thus, safe authentication may be performed without user convenience being compromised.

Referring to FIG. 5, according to an example embodiment, mutual authentication between a first device 510 and a server 520 and mutual authentication between devices 510 and 530 may be performed. The devices 510 and 530 may correspond to a user terminal illustrated in FIG. 1, and the server 520 may correspond to a device operated by a service provider.

The first device 510 may perform mutual authentication with the server 520 through an authentication key that is generated using at least a portion of bio-information and at least a portion of a unique key. In addition, the first device 510 may perform mutual authentication with the second device 530 that is controlled by another user through the authentication key.

Figure 6:
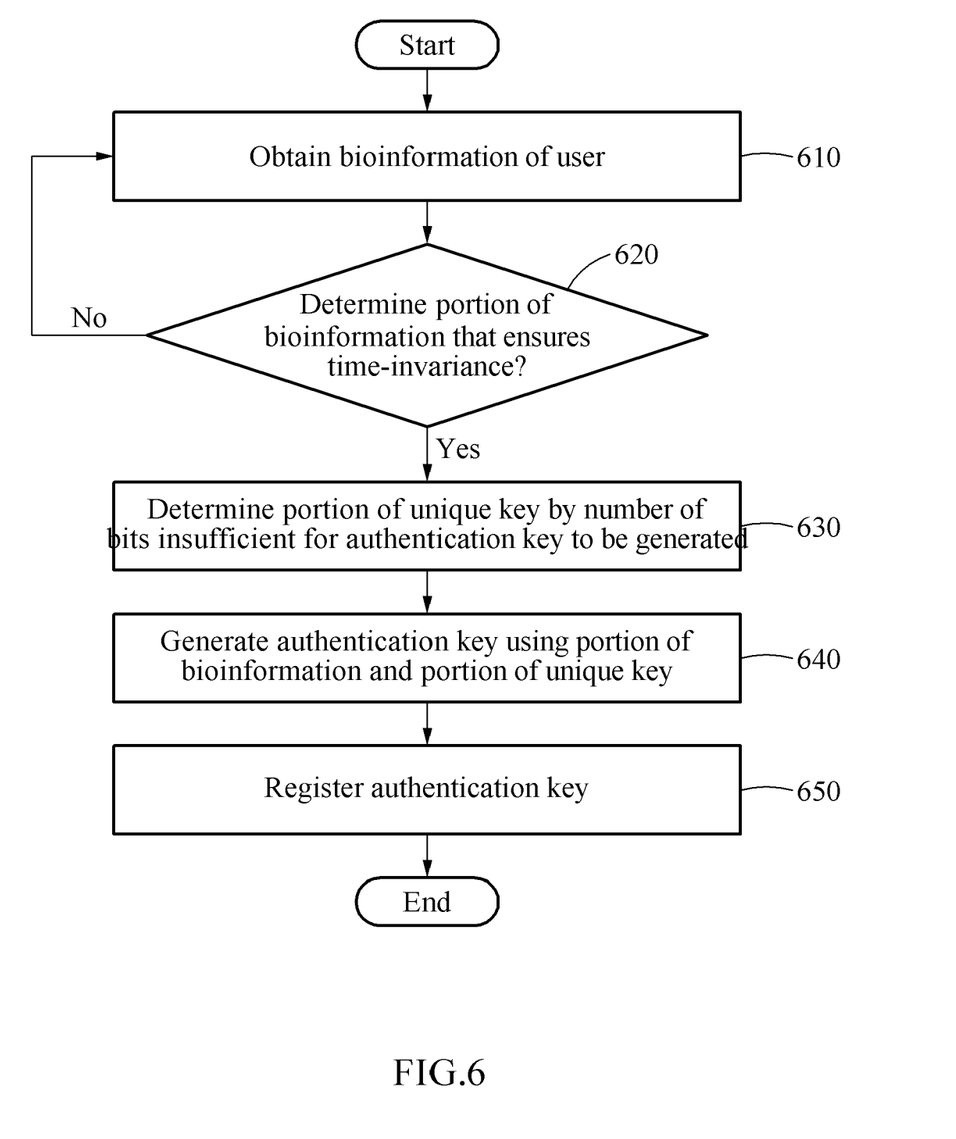
FIG. 6 is a flowchart illustrating an example of registering an authentication key according to an example embodiment.

FIG. 6 is a flowchart illustrating an example of registering an authentication key according to an example embodiment.

In operation 610, an authentication information processing apparatus obtains bio-information of a user as the user who desires to initially register an authentication key allows a biosensor to identify the bio-information of the user. The bio-information may be sensed by the biosensor that is connected to the authentication information processing apparatus through a wired or wireless network.

In operation 620, the authentication information processing apparatus determines at least a portion of the bio-information that ensures time-invariance. For example, the authentication information processing apparatus may perform a test on the bio-information and extract the portion of the bio-information that satisfies time-invariance from the bio-information. To determine the portion of the bio-information that ensures time-invariance, sensing bio-information multiple times may be required. For example, information that is commonly included in bio-information sensed by varying an angle between a finger of the user and a fingerprint sensor, that is, information ensuring time-invariance, may be determined. Until the portion that ensures time-invariance is determined, operation 610 may be performed repeatedly.

In operation 630, the authentication information processing apparatus determines at least a portion of a unique key by the number of bits that is insufficient for the authentication key to be generated. That is, the portion of the unique key may be determined by the number of bits that is insufficient only with the number of bits of the portion of the bio-information that ensures time-invariance and is determined in operation 620, for the authentication key to be generated.

In operation 640, the authentication information processing apparatus generates the authentication key using the portion of the bio-information and the portion of the unique key. For example, the authentication information processing apparatus may generate the authentication key including the portion of the bio-information and the portion of the unique key, or generate the authentication key by applying an encryption algorithm to the portion of the bio-information and the portion of the unique key.

In operation 650, the authentication information processing apparatus registers the generated authentication key. For example, the authentication information processing apparatus may register the authentication key in an internal memory or a server corresponding to a service provider.

Figure 7:
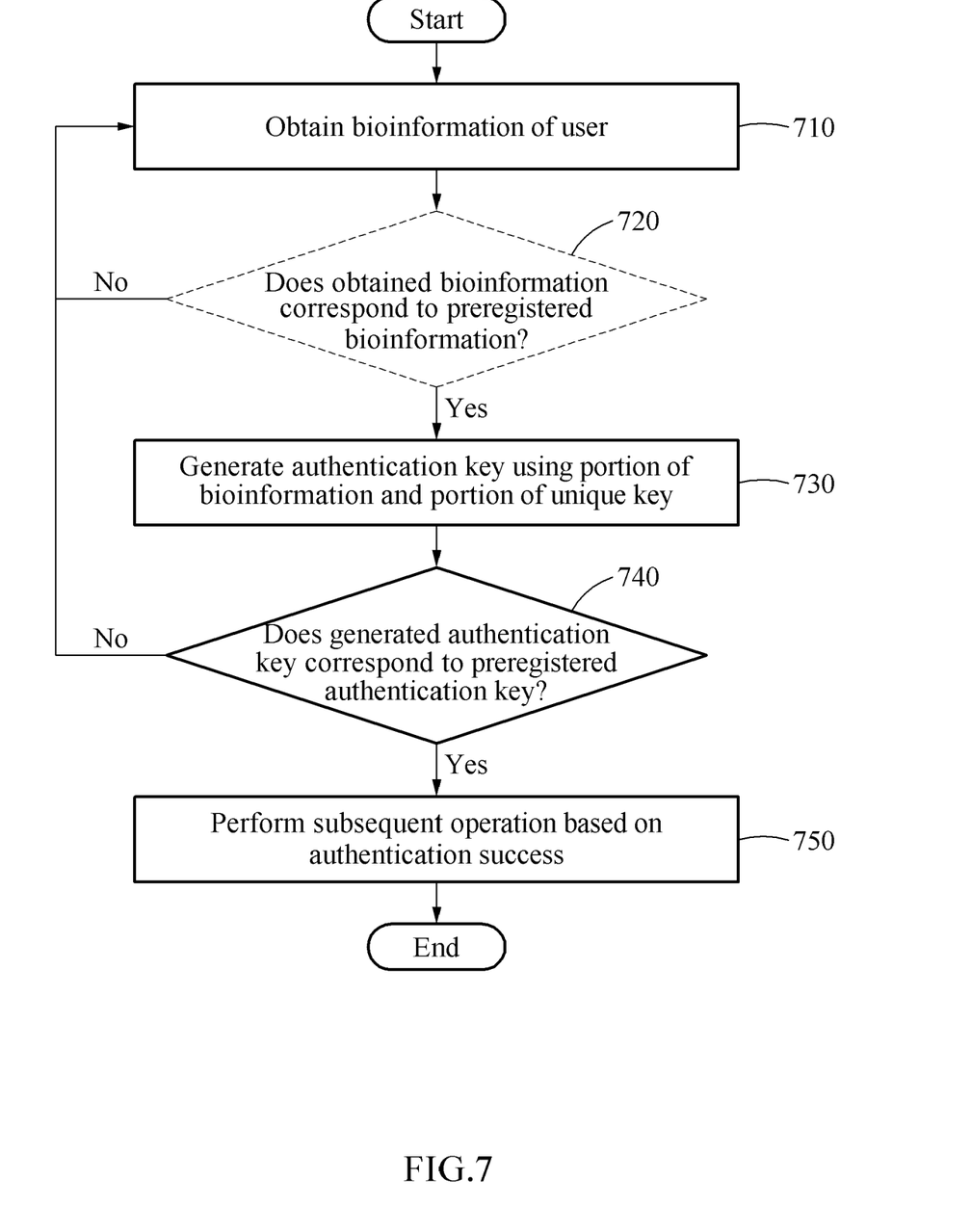
FIG. 7 is a diagram illustrating an example of performing authentication based on whether a generated authentication key corresponds to a preregistered authentication key according to an example embodiment.

FIG. 7 is a diagram illustrating an example of performing authentication based on whether a generated authentication key corresponds to a preregistered authentication key according to an example embodiment.

In operation 710, an authentication information processing apparatus obtains bio-information of a user as the user who desires to use a certain service allows a biosensor to identify the bio-information of the user.

In operation 720, the authentication information processing apparatus determines whether the sensed bio-information corresponds to preregistered bio-information. For example, whether at least a portion of the preregistered bio-information that ensures time-invariance corresponds to the sensed bio-information may be determined. Thus, the portion of the bio-information that ensures time-invariance may be stored in an internal memory of the authentication information processing apparatus in an authentication key registration process. The bio-information to be stored may be encrypted based on a unique key.

When the sensed bio-information does not correspond to the preregistered bio-information, re-recognition of bio-information may be required. In contrast, when the sensed bio-information corresponds to the preregistered bio-information, operation 730 may be performed. In other words, matching between the sensed bio-information and the preregistered bio-information may function as a start instruction for an authentication process that is based on an authentication key generated using the bio-information and the unique key, and thus convenience may not be compromised because additional manipulation or processing of the user is not needed.

As described above, user authentication that is based on the bio-information may be performed first, and thus an unauthorized individual may not proceed with the authentication process using the device even though the unauthorized individual illegitimately possesses the device. Thus, security against a security threat due to a loss of the device may be guaranteed.

In operation 730, the authentication information processing apparatus generates the authentication key using the portion of the bio-information and the portion of the unique key.

In operation 740, the authentication information processing apparatus determines whether the generated authentication key corresponds to a preregistered authentication key. Whether the generated authentication key and the preregistered authentication key correspond to each other may be determined. For example, when the portion of the bio-information and the portion of the unique key, and a ratio between the bio-information and the unique key that is used to generate the authentication key are different, the generated authentication key may not correspond to the preregistered authentication key. When the generated authentication key does not correspond to the preregistered authentication key, re-recognition of bio-information may be needed. In contrast, when the generated authentication key corresponds to the preregistered authentication key, operation 750 may be performed.

In operation 750, the authentication information processing apparatus allows a subsequent operation to be performed based on an authentication success. For example, the authentication information processing apparatus may inform a user terminal of the authentication success, and the user terminal may process the subsequent operation (e.g., payment, financial transactions, login, etc.) intended by the user.

Hereinafter, application examples will be described. The examples to be described hereinafter may be construed as being provided merely as examples, and may not be enumerated in a restrictive manner.

For example, there is a financial payment or online banking process through a device. In a case in which a payment or a banking transaction is performed through PUF-based device authentication, a PUF itself may be unique to a certain device (more particularly, a chip in the device) and not be present in other devices in the same way as it is unique to the device. Thus, performing the authentication based on the PUF may ensure that at least the device attempts to make the payment. To prevent the PUF-based device authentication from being performed by an unauthorized individual or entity, knowledge-based authentication (e.g., payment password-based authentication, etc.) or bio-authentication (e.g., fingerprint- or iris-based authentication, etc.) may be required. However, according to example embodiments described herein, when bio-information is recognized, the recognized bio-information may be considered an instruction for allowing the device to perform the PUF-based device authentication, rather than to perform user authentication and device authentication separately. Thus, a user may allow bio-authentication and device authentication to be performed all at once without two steps.

The effectiveness of the example embodiments may be readily understood in consideration of a mobile application-based smart banking transaction that is currently in wide use. A user may experience user authentication once while executing a smart banking application. In a case, for example, ID/password login, accredited certificate login, or bio-authentication may be used as first authentication. When the user desires to send money to an account of another person, the user may generally experience second authentication after inputting remittance information. The second authentication may be performed by inputting a one-time password (OTP), inputting numbers of a security card, performing automatic response system (ARS) authentication, verifying an identification confirmation code through a text message, or performing authentication using an accredited certificate. The second authentication may require such additional operations or control, causing inconvenience to the user.

However, according to example embodiments described herein, when bio-information is recognized along with basic information for a financial transaction or payment, the transaction or payment may be completed immediately, and thus bio-authentication and (PUF-based) device authentication may be performed altogether through one-time authentication. Thus, a user may not experience inconvenience by performing authentication several times.

A quick remittance will be described hereinafter as a non-limiting example. In a case of a banking application, a typical service may be available through login performed in a typical and general manner. However, when transaction information (e.g., a remittee, bank and account information, a sum to be transacted, etc.) is input into an initial screen after the execution of the application, and bio-information (e.g., a fingerprint, an iris, a face, etc.) is identified, these may allow bio-authentication and device authentication to be automatically performed and a transaction may thereby be completed. In such a case, to prevent the transaction from being erroneously performed due to a mistake, a revocability for a short time may be available after the transaction, and thus the safety of the transaction may be ensured. For example, when a result of a remittance/payment process is informed after the completion of the process and there is an error, the result may be allowed to be canceled and revocable within ten seconds. In this example, when there is no such action for the revocation, the result may proceed accordingly.

Speech recognition will be described hereinafter as another non-limiting example to which example embodiments described herein may be more frequently applied. Voice recognition services provided by various service providers are more widely used. A voice or speech may be a means of inputting information in itself and also be bio-information of a user. It is well-known that a biological characteristic is identified from a voice and bio-authentication is performed therewith. When device-based authentication has a safe means such as a PUF and user voice-based bio-authentication is preregistered, such device authentication and bio-authentication may be performed together through a voice command, for example, "send my wife KRW 100 thousand won" and "send my husband KRW 100 thousand won," and then a transaction that is an actual remittance to an account of a counterpart may be performed.

An authentication method described herein may also be applied to authentication based on an object, such as, for example, a vehicle. For example, when a user utters a preregistered phrase while approaching a vehicle, vehicle control including door opening or starting may be performed, and a fuel cost payment may also be performed between the vehicle and a pump when refueling the vehicle (the same is also applicable to charging an electric vehicle).

For an IoT transaction, non-repudiation may be an important issue. For example, when only a transaction between a thing (e.g., a vehicle) and a thing (e.g., a pump) is performed without a process of user authentication, it may be highly likely that a user repudiates such a transaction that is not through an identification confirmation of the user. For example, the user may repudiate a fee charged to the vehicle of the user, saying that a fee for fueling another vehicle is charged to the vehicle of the user and paid for or saying that he/she did not do such a transaction. Such a scenario may occur because of the omission of user authentication. For example, when the user gives a voice command, for example, "pay for KRW 50 thousand won for refueling," the user may be authenticated based on bio-authentication, and device authentication may also be performed by a means of device authentication (e.g., a PUF-based authentication means) included in the vehicle (e.g., Genesis). The payment may then be performed with non-repudiation. In this process, bio-authentication may function as authentication itself and also a command that initiates device authentication, thereby increasing user convenience.

There are more various fields to which the authentication method is expanded. For example, when a user utters "order pizza" to a smart speaker and the like, the order may be completed even though the user (or a subject) that makes the order is a child. In such a case, a parent of the child may allow the order and payment to proceed through device authentication at least when he or she does voice recognition and bio-authentication. Thus, convenience and safety may be satisfied simultaneously. Also, in a case of a video on demand (VOD) content ordering service, a current service may be performed when a user gives a voice command, for example, "show me Harry Potter," and then makes a payment by inputting a password with a remote controller. In such a case, when a person having the right to order, for example, a mother, gives the voice command with her own voice, the actual order may proceed through voice recognition, bio-authentication, and device authentication. Thus, two-factor authentication and convenience may be satisfied simultaneously. When there are multiple means of authentication, for example, two-factor authentication and further multi-factor authentication, safety and security may increase. However, in such a case, a user may need to go through that many steps for the authentication, and experience inconvenience. However, by processing bio-authentication as a command for device authentication, or generating an authentication key based on both bio-authentication and device authentication, convenience may not be compromised.

As another non-limiting example, some countries in Europe introduce a method of issuing an electronic identification (eID) and replacing, with the eID, an ID card such as a driver's license that is used for identifying a user. In addition, they also introduce a financial card-type electronic passport which is referred to as an electronic identification card (eIC). For example, in Sweden, eID which is called BankID is embedded in an electronic device, such as, for example, a smartphone, and allows a user to do a financial activity such as a secure web login and a payment when he or she does a bank transaction. The supply rate of this card is high. Such an electronic ID card may be generated based on bio-information of a user and a unique key of a device itself. The bio-information of the user and the unique key (e.g., a digital value generated using a PUF) of the device may be included in the electronic ID card, and thus authentication based on this electronic ID card may include both user authentication and device authentication. Thus, two-factor authentication may be enabled only with one-time authentication using the electronic ID card.

According to example embodiments described herein, there are various service types. For example, a user who purchases a new smartphone (or a subscriber ID module (SIM) card) may input bio-information (e.g., a fingerprint, a face, an iris, a voice, etc.) of the user through a sensor of the smartphone to generate an electronic ID card. The new electronic ID card may then be generated by mixing a digital code that is extracted from the input bio-information through a safe process and a unique key provided in the device itself (e.g., a chip in the smartphone, a chip in the SIM card or a secure digital (SD) card, etc.). This may be used as a single means of authentication. The electronic ID card may be used after encryption processing rather than be used as a raw value itself. Although authentication through such an electronic ID card is an integrated single authentication means, user authentication may be performed in that others are not able to generate the same electronic ID card through the device, and device authentication may also be performed in that the user is not able to generate the same electronic ID card when he/she does not possess the device himself/herself even though the user is a valid one.

Figure 8:
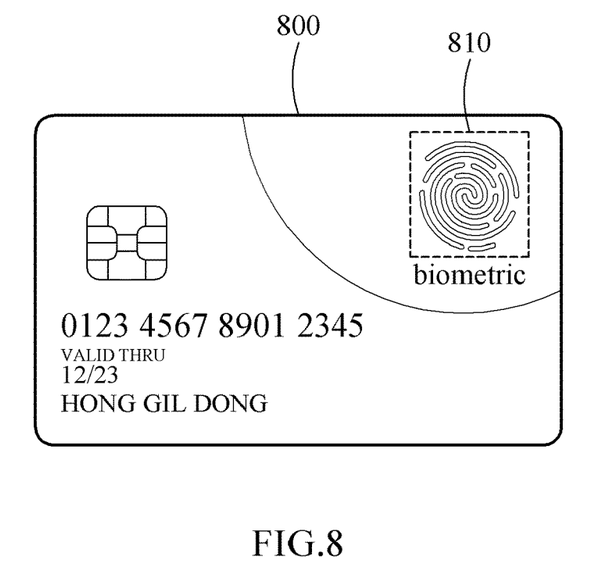
FIGS. 8 and 9 are diagrams illustrating examples of a user terminal according to an example embodiment.
Figure 9:
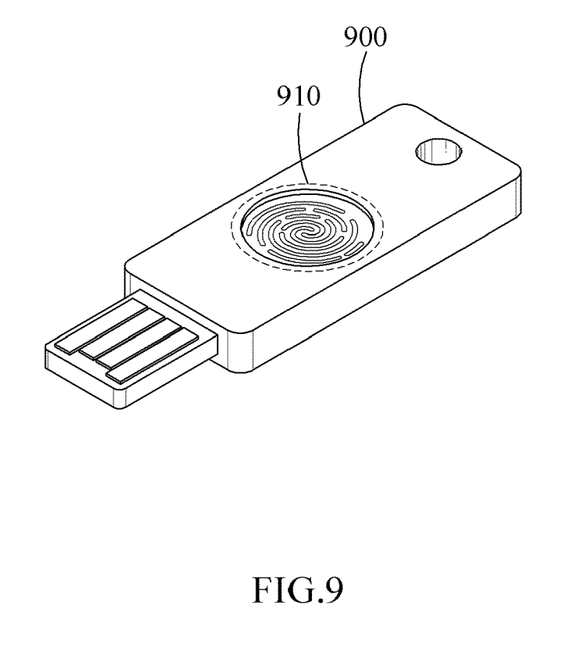

FIGS. 8 and 9 are diagrams illustrating examples of a user terminal according to an example embodiment.

According to an example embodiment, a user terminal may be a device including a biosensor and an authentication information processing apparatus and perform the operations described above. For example, the user terminal may be implemented as a smart credit card 800 in FIG. 8 and a smart storage device 900 in FIG. 9. The smart credit card 800 and the smart storage device 900 may include a fingerprint sensor 810 and a fingerprint sensor 910, respectively, and may thus determine whether a user who attempts to use a corresponding device is a valid or registered user or not based on bio-information of the user and sense the bio-information of the user that is needed to generate an authentication key.

In addition, the smart storage device 900 may encrypt data to be stored with the authentication key and store the encrypted data in an internal memory, and read the stored data only when the authentication key is generated based on bio-information of a valid user and on a unique key associated with the smart storage device 900. Thus, it is possible to implement a secure memory with more enhanced security.

The smart credit card 800 and the smart storage device 900 may process the other operations described above, and a more detailed description thereof will be omitted here for brevity.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An authentication information processing method performed by an authentication information processing apparatus, comprising:
generating an authentication key from a seed key of A bits by:
obtaining bio-information of a user;
determining a portion of the bio-information that ensures time-invariance based on a type of the bio-information, wherein the portion of the bio-information has B bits;
determine whether the user is a valid user based on the bio-information of the user;
obtaining a unique key corresponding to the authentication information processing apparatus;
determining a portion of the unique key by a number of additional bits insufficient for the authentication key to be generated, wherein the portion of the unique key has A-minus-B bits; and
generating the authentication key from the seed key by using at least the portion of the bio-information and at least the portion of the unique key;
wherein the unique key is determined based on a physically unclonable function (PUF) connected to the authentication information processing apparatus;
wherein a number of additional bits of the portion extracted from the bio-information is adaptively determined based on the number of bits ensuring a degree of the time-invariance determined by the type of the bio-information; and
controlling access to electronic resources by performing authentication operation based on the authentication key.

2. The authentication information processing method of claim 1, wherein the portion of the bio-information is extracted from the bio-information of the user that ensures preset standard-based time-invariance.

3. The authentication information processing method of claim 1, wherein the generating of the authentication key comprises:
generating the authentication key comprising the portion of the bio-information and the portion of the unique key, or generating the authentication key by applying an encryption algorithm to the portion of the bio-information and the portion of the unique key.

4. The authentication information processing method of claim 1, wherein
the performing of the authentication operation is based on whether the authentication key corresponds to an authentication key preregistered in the authentication information processing apparatus.

5. The authentication information processing method of claim 1, wherein the generating of the authentication key comprises:
generating the authentication key further using at least a portion of information input from the user and/or at least a portion of authentication information received from a counterpart terminal of the authentication information processing apparatus.

6. The authentication information processing method of claim 1, wherein the bio-information comprises information associated with at least one of a fingerprint, an iris, a voice, a face, a vein distribution, or a retina of the user.

7. An authentication information processing apparatus, comprising:
a processor; and
a memory comprising therein at least one instruction that is executable by the processor,
wherein, when the instruction is executed in the processor, the processor is configured to generate an authentication key from a seed key of A bits by: obtaining bio-information of a user; determining a portion of the bio-information that ensures time-invariance based on a type of the bio-information, wherein the portion of the bio-information has B bits; obtaining a unique key corresponding to the authentication information processing apparatus;
determining a portion of the unique key by a number of additional bits insufficient for the authentication key to be generated, wherein the portion of the unique key has A-minus-B bits;
determining whether the user is a valid user based on the bio-information of the user,
generating the authentication key from the seed key including using at least the portion of the bio-information and at least the portion of the unique key, wherein the unique key is determined based on a physically unclonable function (PUF) connected to the authentication information processing apparatus; and
controlling access to electronic resources by performing authentication operation based on the authentication key,
wherein the number of additional bits of the portion extracted from the bio-information is adaptively determined based on the number of bits ensuring a degree of the time-invariance determined by the type of the bio-information.

8. The authentication information processing apparatus of claim 7, wherein the portion of the bio-information is at least a portion extracted from the bio-information of the user that ensures preset standard-based time-invariance.

9. The authentication information processing apparatus of claim 7, wherein a number of bits of the portion extracted from the bio-information is determined based on at least one of a type of the bio-information, a characteristic of the user, an environment in which the bio-information is sensed, or a characteristic of a sensor that senses the bio-information.

* * * * *